United States Patent [19]

Ross

[11] 4,371,113
[45] Feb. 1, 1983

[54] IRRIGATION SYSTEM

[76] Inventor: Woodrow M. Ross, 1863 Algodon Rd., Marysville, Calif. 95901

[21] Appl. No.: 187,979

[22] Filed: Sep. 16, 1980

[51] Int. Cl.³ ............................................ B05B 15/06
[52] U.S. Cl. .................................... 239/201; 239/279; 285/403; 285/423
[58] Field of Search .................... 285/5, 156, 403, 404, 285/423; 239/66, 76, 200, 201, 207, 266, 268, 273, 279, 567

[56] References Cited

U.S. PATENT DOCUMENTS

| | | | |
|---|---|---|---|
| 32,278 | 5/1861 | Ellicott | 239/201 |
| 500,853 | 7/1893 | Clark | 239/201 |
| 2,805,099 | 9/1957 | Bailey | 239/201 |
| 3,714,962 | 2/1973 | Sauer et al. | 239/207 X |
| 3,734,545 | 5/1973 | Stout | 285/5 |
| 3,920,268 | 11/1975 | Stewing | 285/423 X |

FOREIGN PATENT DOCUMENTS 20820 7/1930 Australia .............................. 239/200

Primary Examiner—Andres Kashnikow
Attorney, Agent, or Firm—Harvey B. Jacobson

[57] ABSTRACT

An irrigation system is constructed from PVC pipe which is tapped into a main waterline buried beneath the surface of the earth. The main waterline is constructed from sections of plastic irrigation pipe having male and female coupling ends, and holes are drilled in the coupled portions of the main waterline pipes so as to permit insertion of water distributing PVC pipes. By drilling the holes in the coupled portions of the main waterline, a double wall thickness is provided for strength into which is insertable PVC nipples which in turn are connectible to PVC risers extending above the ground. PVC emitter pipes may then be connected to the risers through the use of nipples or alternatively, the emitter pipes and risers may be of a unitary, integral construction. A plurality of orifices are provided in the emitter pipes so as to facilitate the distributing of water across the surface of the ground.

8 Claims, 5 Drawing Figures

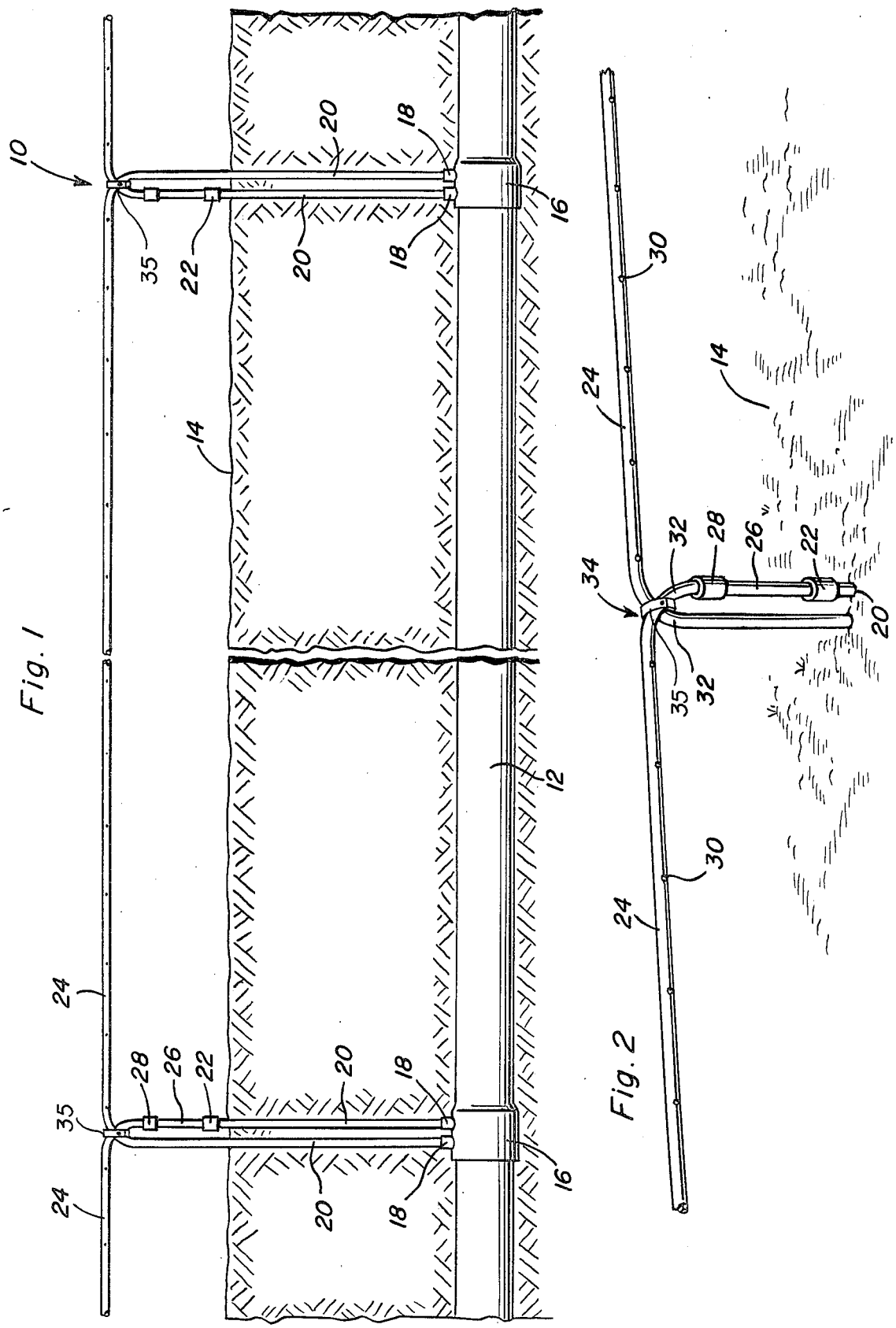

IRRIGATION SYSTEM

BACKGROUND OF THE INVENTION

1. Field of the Invention

The present invention relates to irrigation systems and more particularly pertains to a new and novel irrigation system constructed entirely of plastic pipe and utilizing a unique coupling means for providing the required strength and durability to make such a system functional.

2. Description of the Prior Art

Those concerned with the development of irrigation systems for use in supplying needed water to crops and the like, have long recognized the need for reducing the cost and complexity of irrigation systems as now employed. For example, irrigation systems are typically used to supply water to extremely large tracts of crop land and as such, whatever system is employed usually has associated therewith a tremendous expense in materials needed to construct the same. In this respect, it can be appreciated that a tremendous expense might be expected if a system were constructed totally of metallic pipe, since it is conceivable that even a relatively small sized farm might be forced to utilize many thousands of feet of pipe for delivering water to the crops. However, where such conduit delivery systems are used as the means of delivering water to the crops, it has been typically found that metallic pipe is the only reasonable means of delivering the water due to its strength and durability when exposed to the elements over a period of time.

Of course, there has existed alternative means of delivering irrigation water to crop lands which do not make use of conduit delivery systems. For example, these alternative systems often utilize canals or ditches dug into the crop land whereby the water may be delivered along the surface of the land to the crops. These canals and ditches present many problems however, since they must be continually dredged out to maintain a proper flow of water therethrough, and further, in hot climates, which is typically where irrigation is needed, there is a rapid loss of irrigation water due to evaporation. As such, the more desirable method of delivering irrigation water to crop lands is through the use of the afore-described conduit delivery systems so as to effectively reduce the loss of water due to evaporation and to eliminate the necessity of maintaining a complex system of canals and ditches.

Other means which have been employed to irrigate crop lands include the manual delivery of water directly to the crops, for example as through the use of spraying machines transportable by means of motor vehicles. In this regard, large tanks of water must be continually transported along with the spraying machines and as such, there is tremendous expense involved, both in time and money, in delivering the water to the crops. Accordingly, these spraying machines are a less desirable way of delivering water than a conduit system.

Recognizing then that the most desirable method of delivering irrigation water to dry areas is through the use of a conduit system, one of the most critical problems confronting developers of irrigation systems has been how to reduce the expense of these systems due to the frequent necessity of utilizing metallic conduits as above discussed. In this regard, it has been recognized that conduit systems utilizing materials other than metal deteriorate rapidly when exposed to the elements and generally lack the strength and durability required for a long term use. This critical problem has been overcome by the present invention.

SUMMARY OF THE INVENTION

The general purpose of the present invention, which will be described subsequently in greater detail, is to provide an irrigation system that has all of the advantages of similarly employed irrigation systems and has none of the above described disadvantages. To attain this, the present invention utilizes exclusively plastic pipe, such as PVC, the major portion of which is buried beneath the surface of the earth so as to prevent damage to the same from exposure to the elements. In this regard, a main waterline consisting of plastic irrigation pipe is buried beneath the surface of the ground and is coupled in sections through the use of male and female coupling means whereby a double wall thickness of pipe is provided at each coupling point. These points of coupling having a double wall thickness are of sufficient length so as to provide room for at least two nipples to be inserted transversely through the double wall and into communication with the main flow of water within the waterline. PVC risers are then attached to the nipples and are directed upwardly through the surface of the earth to which are then attached PVC emitter pipes, such emitter pipes being either integrally or separably attached to the risers and having a plurality of small orifices therein for effectively spraying water over the surface of the ground. Each emitter pipe is attached at both ends thereof to the aforementioned risers which are in communication with the double walled coupling means associated with the main waterline. As such, the ends of an emitter pipe both begin and terminate in the main waterline through the use of the PVC risers.

It is therefore an object of the present invention to provide an irrigation system which has all of the advantages of the prior art irrigation systems and none of the disadvantages.

It is another object of the present invention to provide an irrigation system which uses conduit piping and which may be easily assembled.

It is a further object of the present invention to provide a conduit irrigation system which may be easily and economically manufactured.

Still another object of the present invention is to provide for an irrigation system which is constructed entirely of plastic piping.

An even further object of the present invention is to provide a coupling means for use in combination with a plastic pipe irrigation system wherein such coupling means provides the needed strength and rigidity required of such a system.

Yet another object of the present invention is to provide a conduit irrigation system which may be substantially buried beneath the surface of the earth thereby to prevent damage to the same through exposure to the elements.

These together with other objects and advantages which will become subsequenty apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is an elevation view of a preferred embodiment of the irrigation system forming the present invention and as operably installed within and above the ground.

FIG. 2 is a perspective view of the emitter pipe portion of the present invention as it appears emerging from the ground.

DESCRIPTION OF THE PREFERRED EMBODIMENTS

Figure 3:
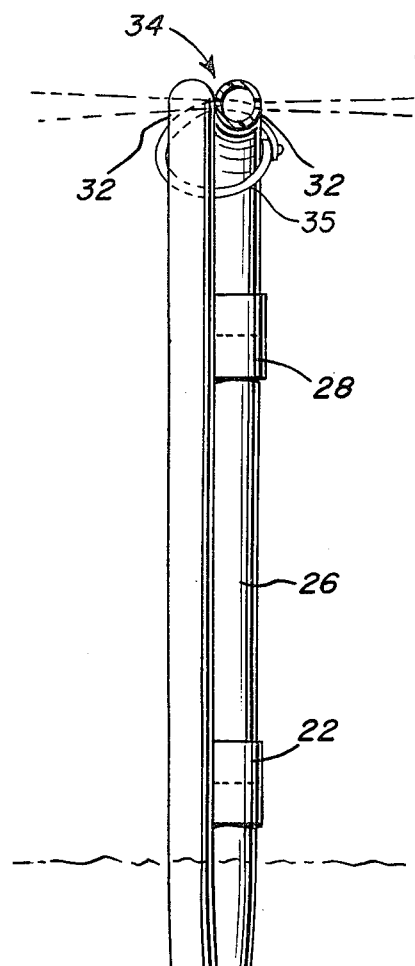
FIG. 3 is a transverse cross sectional view of the present invention illustrating some of the constructional details thereof.

Referring now to the drawings and, in particular, to FIG. 1 wherein there is illustrated a preferred embodiment of the irrigation system forming the present invention as generally designated by the numeral 10. In this connection, the system 10 is illustrated as including a main waterline 12, which is envisioned as being constructed of plastic irrigation pipe and which is buried at some depth below the surface of the ground 14. As can be appreciated, the main waterline 12 is connectible to an unshown source of irrigation water of the type which is available for use with conventional irrigation systems. The main waterline 12 is illustrated as comprising a plurality of sections, such sections being joined together at coupling points 16 through the use of a male and female coupling arrangement. Positionable within each of the coupling points 16 are a pair of PVC nipples 18, such nipples being in communication with the interior of the main waterline 12 and having PVC pipes or risers 20 connected thereto. As such, the risers 20 are similarly in communication with the water contained in the main waterline 12 and serve to direct this water towards the surface of the ground 14 in the manner illustrated.

The risers 20 will typically extend for only a short distance above the surface of the ground 14 and will have attached to their extending ends additional PVC nipples 22. Emitter pipes 24, which are also of a PVC material, may then be connected to the risers 20 to effectively distribute water contained within the main waterline 12 over the surface of the ground 14. The emitter pipes 24 may be positioned at any desired elevation above the ground 14 through the use of extension pipes 26, also of a PVC material, which are positionable within the riser nipples 22 and which are provided with further nipples 28 at free ends thereof. In this respect, the emitter pipes 24 are then positionable within the extension pipe nipples 28 so as to effectively complete the communication between the emitter pipes 24 and the main waterline 12.

Optionally, as further illustrated in FIG. 1, the risers 20 and emitter pipes 24 may be of a unitary, integral construction whereby no nipples 22, extension pipes 26 or nipples 28 will be required or used. It should be noted that each emitter pipe 24 is connected at both ends thereof to separate coupling points 16 through the use of two risers 20. As such, water is provided from the main waterline 12 to an emitter pipe 24 through two risers 20 thereby reducing the effect of lost pressure within the emitter pipe along the length thereof. In other words, conventional conduit irrigation systems often use emitter pipes which are connected at only one end thereof to a main waterline and the other end is simply sealed off. As such, as water travels through such a prior art distribution pipe, there is a substantial loss of pressure due to the water being emitted outwardly through a plurality of apertures contained therein, and by the time the water reaches the end of the distribution pipe, there is much less pressure present for ejecting the water outwardly over the ground. Accordingly, a very uneven distribution of irrigation water across the surface of the ground often results. By providing water to both ends of the emitter pipe 24 of the present invention, a substantially constant pressure is maintained within the emitter pipe thereby to effect an even and uniform distribution of irrigation water over the surface of the ground 14.

With reference to FIG. 2 of the drawings, a more detailed understanding regarding the construction of the emitter pipe 24 and optional extension pipe 26 can be ascertained. In this connection, it can be seen that the emitter pipe 24 includes a plurality of apertures or orifices 30 through which water may be discharged upon the surface of the ground 14. The orifices 30 may be directed in any desired direction to facilitate the distribution of irrigation water, i.e., they may be directed exclusively upwardly, downwardly or transversely, or in any combination of these directions. FIG. 2 further illustrates the fact that the extension pipes 26 may be of any desired length so as to control the degree of water coverage over the ground 14 in relation to the types of crops being grown and in relation to the amount of available water pressure within the main waterline 12. In this regard, PVC pipe may be easily cut and rejoined together through the use of additional nipples, and all connections are made by using a conventional glue which effectively melts portions of the PVC pipe and nipples together. As such, when it is desired to bring the water to the surface of the ground 14 and to discharge the same over an unvarying surface area, the nipples 28 and extension pipes 26 may be dispensed with, thereby to allow a continuing, integral connection between the emitter pipes 24 and the risers 20. Further, the number of apertures 30 can be substantially varied which of course would affect the rate and pressure of water discharge, and if desired, the curved portion 32 of the emitter pipes 24 could either be decreased or increased in radius so as to change the effective elevation of the emitter pipe 24 above the surface of the ground 14.

Noteworthy also with respect to the illustration of FIG. 2 is the fact that the emitter pipes 24 crossover each other at their point of emergence from the ground 14. In other words, the most rightwardly directed extension pipe 26 is connected to an emitter pipe 24 which goes off in a left direction, while the leftwardly directed extension pipe 26 is connected to an emitter pipe 24 which goes off in a rightward direction, thereby forming a cross point 34 between the curved portions 32 of the respective emitter pipes. This construction is desirable in that it adds some additional strength to the entire structure coming out of the ground 14 since it can be appreciated that any warpage or bending of the pipes may be effectively blocked in at least some directions by their impinging upon one another.

In this regard, reference is made to FIG. 3 of the drawings where it can be seen that the crossover point 34 serves as a point of contact between the curved portions 32 of the respective emitter pipes 24. As such, if desired, the pipes could be attached together at this point, as through the use of some form of strap means 35 or the like, thereby to provide mutual support between the adjacent emitter pipes 24 so as to even further increase the strength and durability thereof. This added strength is desirable since the respective emitter pipes 24 are normally supported above the ground solely by their ends in contact with the risers 20 or optional extension pipes 26, such strength and support being derived by the structural configuration of the curved portions 32. Further illustrated in FIG. 3 is the fact that the extension pipes 26 are of a separable construction, such construction being illustrated by the broken lines within nipples 22 and 28 respectively, thereby emphasizing the fact that the extension pipes may be varied in length to accomplish the task desired.

Figure 4:
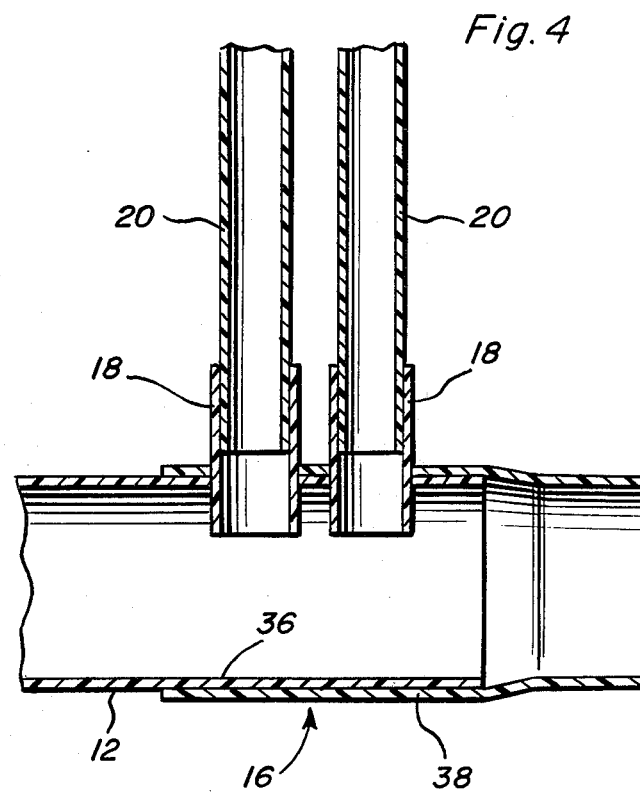
FIG. 4 is an enlarged longitudinal cross sectional view taken along the line 4—4 of FIG. 3.

With reference to FIG. 4 of the drawings, it can be seen that the main waterline 12 is provided with a male coupling end 36 and a female coupling end 38, whereby when two sections of the main waterline are joined together, the female end concentrically overlies the male end to thereby present a doublewalled construction as aforedescribed. This connection of the coupling point 16 is made complete through the use of the aforementioned conventional plastic connection glue so as to effect a watertight seal. Similarly, the main waterline connection nipples 18 are then illustrated as being directed through the double-walled portion of the coupling 16, such nipples being rigidly secured through the use of glue and having sufficient strength to support the risers 20 due to the double-walled construction of the coupling. The risers 20 then of course are glued into the nipples 18 so as to effect a permanent and watertight seal. It should be noted that the nipples 18 extend only partially into the interior of the main waterline 12 so as not to substantially interfere with the flow of water therethrough.

Figure 5:
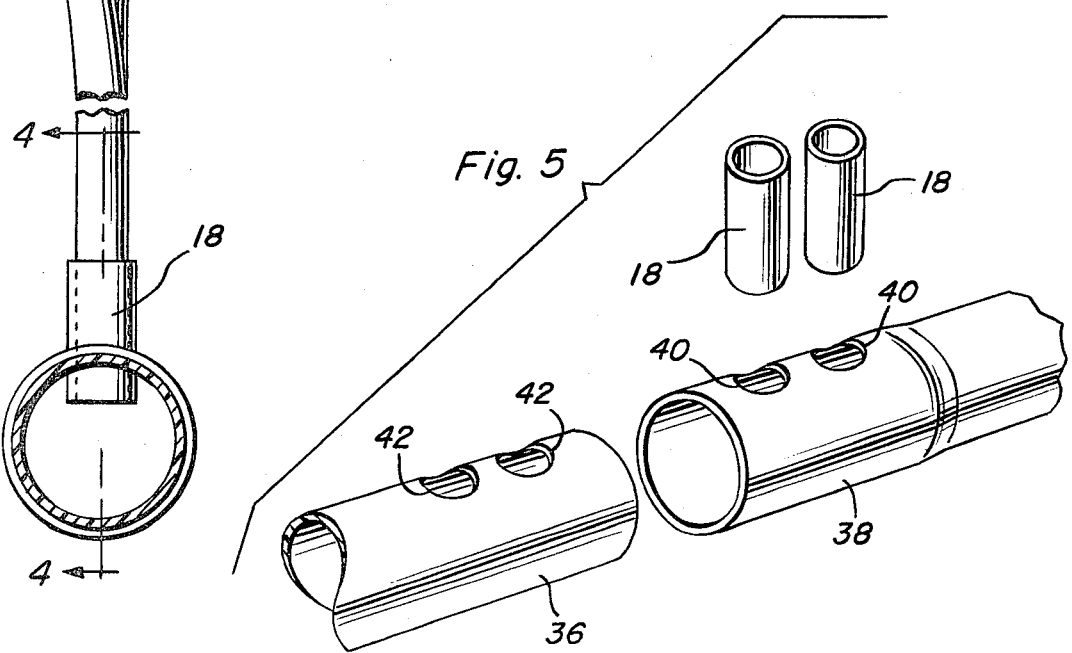
FIG. 5 is an exploded perspective view illustrating some of the assembly details of the present invention.

FIG. 5 illustrates the coupling 16 in a disassembled exploded view so as to further illustrate the manner of assembly of the present invention. In this respect, the female end 38 of a main waterline section of pipe is shown as having two apertures 40, while the male end 36 of a section of pipe is illustrated as having a pair of apertures 42. As is apparent from the foregoing description, the apertures 40 are alignable with the apertures 42 upon an assembly of the main waterline prior to the insertion of the nipples 18. Alternatively, the female and male ends 38, 36, respectively, of the pipe 12 could be first cemented together and then the apertures 40, 42 could be drilled simultaneously to thereby provide a means of attachment for the nipples 18. As such, it can be appreciated that the method of assembly of the present invention may vary somewhat in its operational steps.

In use, the dimensional relationships of the various parts of the present invention may be varied to a large degree. For example, a drill size for cutting out the apertures 40, 42 within the PVC male and female coupling 16 should be compatible with the size of the emitter pipe 24. The nipples 18 might then typically be inserted ¼" to ⅜" past the inside wall of the male member 36 before gluing in place. The risers 20 are then attached to the respective nipples 18, and the extension pipes 26, along with the extension pipe couplers 28, can be used or not as necessary. The emitter lines 24 are added in the manner aforedescribed and the size and positioning of the apertures or orifices 30 may then be determined by the volume of water that is desired for the particular application. To make this determination, a standpipe might be used to obtain the pressure and volume count so as to accurately figure the size of the orifices. These orifices 30 might typically be placed at approximately two foot intervals which varies, of course, in relation to the volume of water desired, and in determining the volume, pressure, etc., the standard formula employing a 23½ feet "foot head" as equalling ten pounds per square inch is used. The orifices 30 may be placed within the emitter pipes 24 through the use of drills which vary from 3/32" to ¼". Further, the preferred embodiment envisions at least fifty sizes of orifices 30 having no more than a total of ¼" variation. With respect to the above description then, it should be realized that optimum dimensional relationships for the parts of the invention are deemed readily apparent and obvious to one skilled in the art, and all equivalent relationships to those illustrated in the drawings and described in the specification are intended to be encompassed by the present invention.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An irrigation system for delivering irrigation water to a desired location, said system comprising: main water supply means; conduit means attached to said main water supply means for directing said irrigation water therefrom; coupling means for connecting said conduit means to said main water supply means; distribution means for receiving said irrigation water directed from said main supply water means, said distribution means including an emitter conduit means having orifices therein for distributing said irrigation water to said desired location, said emitter conduit means further having two ends, both of said ends being in communication with said main water supply means, said main water supply means comprising sections of plastic irrigation pipe, said plastic irrigation pipe having male and female ends thereon so as to effect a double-walled connection between said sections, said main water supply means being substantially buried beneath a ground surface, said coupling means for connecting said conduit means to said main water supply means including at least one aperture extending through said double-walled connection of said main water supply means, said aperture having a nipple means fixedly attached therein, said conduit means being fixedly secured to said nipple means to thereby effect a communication between an interior portion of said main water supply means and said conduit means, said double-walled connection serving to rigidly support said nipple means and said conduit means attached thereto, said conduit means and said nipple means being constructed of PVC pipe, said conduit means further including a separable extension means attached thereto, said extension means serving to fluidly connect said conduit means with said distribution means, said extension means being fixedly secured between said distribution means and said conduit means through the use of additional nipples, said additional nipples and said extension means all being constructed of PVC material, an additional aperture being provided in said double-walled connection thereby to provide for a second conduit means to be attached to a second nipple means fixedly secured thereto, said second conduit means being fluidly connected to a second distribution means, said first and second distribution means being in an abutting relationship so as to mutually support each other in a position above said ground surface.

2. The irrigation system as defined in claim 1, wherein said distribution means is fixedly attached to said second distribution means so as to provide said mutual support.

3. The irrigation system as defined in claim 1, wherein said abutting relationship is achieved through crossing over said distribution means and said second distribution means with respect to one another in directing the same to said desired location.

4. An irrigation system for delivering irrigation water to a desired location, said irrigation system comprising:
 a main water supply means, said main water supply means including a plurality of sections of PVC pipe buried beneath a ground surface, said sections being joined together through the use of a male and female coupling arrangement, said arrangement including the insertion of one section of said pipe into an expanded portion of another section of said pipe to thereby achieve a double-walled construction, said sections of pipe being glued together;
 conduit means attached to said main water supply means for delivering said irrigation water from said main water supply means to a desired location, said conduit means including plastic conduit risers attached to said main water supply means, said risers extending above the surface of said ground;
 coupling means for connecting said conduit means to said main water supply means, said coupling means including at least one aperture drilled through said double-walled construction and having a plastic nipple inserted and fixedly secured therein, said riser being fixedly positionable within said nipple to thereby achieve a fluid communication between an interior portion of said main water supply means and said conduit means;
 distribution means for receiving said irrigation water from said conduit means, said distribution means including an emitter conduit means fixedly secured to said riser through the use of plastic nipple means, said distribution means being in an abutting relationship with a support means so as to mutually support each other in a position above ground surface, said emitter conduit means comprising plastic pipe having a plurality of orifices therein for distributing water over said ground surface, said emitter conduit means extending substantially horizontally over said ground surface; and
 pressure control means for maintaining an even and uniform distribution of irrigation water from said orifices, said pressure control means comprising the attachment of said emitter conduit means at both ends thereof to two conduit means positioned above the ground surface so as to provide said irrigation water to said emitter conduit means from opposite ends thereof.

5. The irrigation system as defined in claim 4, wherein said conduit means and said nipple means are constructed of PVC pipe.

6. The irrigation system as defined in claim 5, wherein said conduit means further includes a separable extension means attached thereto, said extension means serving to fluidly connect said conduit means with said distribution means.

7. The irrigation system as defined in claim 6, wherein said extension means is fixedly secured between said distribution means and said conduit means through the use of additional nipples, said additional nipples and said extension means all being constructed of PVC material.

8. An irrigation system for delivering irrigation water to a desired location, said irrigation system comprising:
 a main water supply means, said main water supply means including a plurality of sections of PVC pipe buried beneath a ground surface, said sections being joined together through the use of a male and female coupling arrangement, said arrangement including the insertion of one section of said pipe into an expanded portion of another section of said pipe to thereby achieve a double-walled construction, said sections of pipe being glued together;
 distribution means attached to said main water supply means for receiving and delivering said irrigation water from said main water supply means to a desired location, said conduit means including plastic conduit risers attached to said main water supply means, said risers extending above the surface of said ground;
 coupling means for connecting said distribution means to said main water supply means, said coupling means including at least one aperture drilled through said double-walled construction and having a plastic nipple inserted and fixedly secured therein, said distribution means being fixedly positionable within said nipple to thereby achieve a fluid communication between an interior portion of said main water supply means and said distribution means;
 said distribution means including an emitter conduit means fixedly secured to said risers, said emitter conduot means comprising plastic pipe having a plurality of orifices therein for distribution water over said ground surface, said emitter conduit means extending substantially horizontally over said ground surface; and
 pressure control means for maintaining an even and uniform distribution of irrigation water from said orifices, said pressure control means comprising the attachment of said emitter conduit means at both ends thereof to said main water supply means positioned below the ground surface surface so as to provide said irrigation water to said emitter conduit means from opposite ends of the distribution means.

* * * * *